United States Patent
Thygesen et al.

(10) Patent No.: US 9,562,633 B2
(45) Date of Patent: Feb. 7, 2017

(54) FLEXIBLE PIPE AND A METHOD OF PRODUCING A FLEXIBLE PIPE

(75) Inventors: Mads Thygesen, Rodovre (DK); Rasmus C. Ostergaard, Copenhagen O (DK); Kim Steen Olsen, Glostrup (DK); Kristian Glejbol, Glostrup (DK); Morten Storgaard Nielsen, Copenhagen N (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 673 days.

(21) Appl. No.: 13/504,163

(22) PCT Filed: Oct. 28, 2010

(86) PCT No.: PCT/DK2010/050287
§ 371 (c)(1),
(2), (4) Date: Jul. 6, 2012

(87) PCT Pub. No.: WO2011/050810
PCT Pub. Date: May 5, 2011

(65) Prior Publication Data
US 2012/0266997 A1    Oct. 25, 2012

(30) Foreign Application Priority Data
Oct. 28, 2009   (DK) .................................. 2009 01163

(51) Int. Cl.
*F16L 57/00*   (2006.01)
*F16L 11/08*   (2006.01)
(Continued)

(52) U.S. Cl.
CPC .............. *F16L 11/083* (2013.01); *F16L 11/16* (2013.01); *F16L 11/18* (2013.01)

(58) Field of Classification Search
CPC ............ F16L 11/16; F16L 11/18; F16L 11/083
(Continued)

(56) References Cited

U.S. PATENT DOCUMENTS 24,222 A * 5/1859 McBurney .............. F16L 9/147
138/120
3,311,133 A   3/1967 Kinander
(Continued)

FOREIGN PATENT DOCUMENTS

EP   1473503 A1   11/2004
FR   2 260 740 A2   9/1975
(Continued)

OTHER PUBLICATIONS

Specification for U.S. Appl. No. 13/499,974 (Corresponding to DK PA 2009 01086) filed May 15, 2012.
(Continued)

*Primary Examiner* — Kevin P Shaver
*Assistant Examiner* — Robert Nichols, II
(74) *Attorney, Agent, or Firm* — Pearne & Gordon LLP

(57) ABSTRACT

The invention relates to a flexible pipe comprising an axis and a tubular innermost sealing sheath surrounding said axis, said innermost sealing sheath being surrounded by at least one outer armoring layer. The innermost sealing sheath has an inner side which is the side of the innermost sealing sheath comprising said axis. On the inner side of said innermost sealing sheath the flexible pipe comprises at least one carcass comprising a plurality of annular armoring members.

18 Claims, 14 Drawing Sheets

(51) Int. Cl.
*F16L 11/16* (2006.01)
*F16L 11/18* (2006.01)

(58) Field of Classification Search
USPC .................................................. 138/120, 137
See application file for complete search history.

(56) References Cited

U.S. PATENT DOCUMENTS

| | | | |
|---|---|---|---|
| 3,530,564 A | | 9/1970 | Cullen |
| 3,687,169 A | | 8/1972 | Reynard |
| 3,858,616 A | | 1/1975 | Thiery et al. |
| 3,908,703 A | * | 9/1975 | Bournazel et al. ........... 138/120 |
| 4,402,346 A | | 9/1983 | Cheetham et al. |
| 4,549,581 A | | 10/1985 | Unno et al. |
| 4,706,713 A | | 11/1987 | Sadamitsu et al. |
| 5,176,179 A | | 1/1993 | Bournazel et al. |
| 5,213,637 A | | 5/1993 | Herrero et al. |
| 5,407,744 A | | 4/1995 | Herrero et al. |
| 5,601,893 A | | 2/1997 | Strassel et al. |
| 5,645,109 A | | 7/1997 | Herrero et al. |
| 5,669,420 A | | 9/1997 | Herrero et al. |
| 5,730,188 A | | 3/1998 | Kalman et al. |
| 5,813,439 A | | 9/1998 | Herrero et al. |
| 5,837,083 A | | 11/1998 | Booth |
| 5,922,149 A | | 7/1999 | Herrero et al. |
| 6,016,847 A | | 1/2000 | Jung et al. |
| 6,065,501 A | | 5/2000 | Feret et al. |
| 6,085,799 A | | 7/2000 | Kodaissi et al. |
| 6,123,114 A | | 9/2000 | Seguin et al. |
| 6,145,546 A | | 11/2000 | Hardy et al. |
| 6,148,818 A | | 11/2000 | Pagan et al. |
| 6,192,941 B1 | | 2/2001 | Mallen-Herrero et al. |
| 6,253,793 B1 | | 7/2001 | Dupoiron et al. |
| 6,282,933 B1 | | 9/2001 | Dupoiron |
| 6,283,161 B1 | | 9/2001 | Feret et al. |
| 6,291,079 B1 | | 9/2001 | Herrero et al. |
| 6,354,333 B1 | | 3/2002 | Dupoiron et al. |
| 6,382,681 B1 | | 5/2002 | Berton et al. |
| 6,390,141 B1 | | 5/2002 | Fisher et al. |
| 6,408,891 B1 | | 6/2002 | Jung et al. |
| 6,415,825 B1 | | 7/2002 | Dupoiron et al. |
| 6,454,897 B1 | | 9/2002 | Morand |
| 6,516,833 B1 | | 2/2003 | Witz et al. |
| 6,668,867 B2 | | 12/2003 | Espinasse et al. |
| 6,691,743 B2 | | 2/2004 | Espinasse |
| 6,739,355 B2 | | 5/2004 | Glejbol et al. |
| 6,840,286 B2 | | 1/2005 | Espinase et al. |
| 6,889,717 B2 | | 5/2005 | Coutarel et al. |
| 6,889,718 B2 | | 5/2005 | Glejbol et al. |
| 6,904,939 B2 | | 6/2005 | Jung et al. |
| 6,978,806 B2 | | 12/2005 | Glejbol et al. |
| 6,981,526 B2 | | 1/2006 | Glejbol et al. |
| 7,024,941 B2 | | 4/2006 | Andersen |
| 7,032,623 B2 | | 4/2006 | Averbuch et al. |
| 7,302,973 B2 | * | 12/2007 | Glejbol et al. ................. 138/135 |
| 7,311,123 B2 | | 12/2007 | Espinasse et al. |
| 7,318,454 B2 | * | 1/2008 | Dupoiron ................ F15D 1/065 138/134 |
| 7,459,033 B2 | | 12/2008 | Asahi et al. |
| 7,487,803 B2 | | 2/2009 | Lokere et al. |
| 9,206,929 B2 | * | 12/2015 | Graham ................. F16L 11/081 |
| 2003/0102044 A1 | | 6/2003 | Coutarel et al. |
| 2004/0261878 A1 | * | 12/2004 | Jung ....................... F16L 11/16 138/135 |
| 2010/0089478 A1 | * | 4/2010 | Gudme ......................... 138/104 |

FOREIGN PATENT DOCUMENTS

| | | |
|---|---|---|
| GB | 836203 | 6/1960 |
| GB | 1404394 | 8/1975 |
| WO | 01/61232 A1 | 8/2001 |
| WO | 02/095281 A1 | 11/2002 |
| WO | 2005/043020 A1 | 5/2005 |
| WO | 2006/097112 A2 | 9/2006 |
| WO | 2008/025893 A1 | 3/2008 |
| WO | 2008/077409 A1 | 7/2008 |
| WO | 2008/077410 A1 | 7/2008 |
| WO | 2009/024156 A2 | 2/2009 |
| WO | 2009/106078 A1 | 9/2009 |
| WO | 2011/042023 A1 | 4/2011 |

OTHER PUBLICATIONS

Supplemental European Search Report for 10 82 6124 dated Sep. 23, 2014.

* cited by examiner

Hollow core of pipe

Bore of pipe

Bore of pipe

FLEXIBLE PIPE AND A METHOD OF PRODUCING A FLEXIBLE PIPE

TECHNICAL FIELD

The invention relates to a flexible pipe in particular for transportation of hydrocarbons and or water and/or for an umbilical as well as a method for producing such pipe.

BACKGROUND ART

Flexible pipes of the present type are well known in the art in particular for offshore transportation of fluids. Such pipes comprise usually an inner liner also often called an innermost sealing sheath or an inner sheath, which forms a barrier against the outflow of the fluid which is conveyed through the pipe, and one or more armoring layers on the outer side of the inner liner (outer armoring layer(s)). An outer sheath may be provided with the object of forming a barrier against the ingress of fluids from the pipe surroundings to the armor layers.

Typical unbonded flexible pipes are e.g. disclosed in WO0161232A1, U.S. Pat. No. 6,123,114 and U.S. Pat. No. 6,085,799.

In order to have sufficient strength, in particular to prevent the collapse of the innermost sealing sheath, the flexible pipe often comprise an armor layer located inside the space defined by the innermost sealing sheath. Such carcass layer or layers are normally referred to as a carcass.

The flexible pipes are often unbonded pipes. The term "unbonded" means in this text that at least two of the layers including the armoring layers and polymer layers are not bonded to each other. In practice the known pipe normally comprises at least two armoring layers located outside the innermost sealing sheath. The armoring layers are not bonded to each other directly or indirectly via other layers along the pipe. Thereby the pipe becomes bendable and sufficiently flexible to roll up for transportation. The outer armor layer or layers located outside the innermost sealing sheath are normally referred to as pressure armor, tensile armor or balanced pressure and tensile armor.

The above-mentioned type of flexible pipes is used, among other things, for off shore as well as some on-shore applications for the transport of fluids and gases. Flexible pipes can e.g. be used for the transportation of fluids where very high or varying water pressures exist along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

In traditional flexible pipes, such as steel based flexible pipes i.e. where the armoring layers are mainly of steel, the armoring layers are in the form of helically wound profiles or wires, where the individual layers may be wound with different winding angles relative to the pipe axis in order to take up the forces caused by internal and external pressure as well as forces acting at the ends of the pipe and shear forces from the surrounding water. The carcass is typically wound from preformed or folded stainless steel strips.

A pipe of the above type will for many applications need to fulfill a number of requirements. First of all the pipe should have high mechanical strength to withstand the enormous forces it will be subjected to during transportation, laying down and in operation. The internal pressure (from inside of the pipe and outwards) and the external pressure (from outside of the pipe) are very high and may vary considerably along the length of the pipe. If the pipe resistance against the internal pressure is too low the internal pressure may ultimately result in that the pipe is damaged e.g. by upheaval buckling and/or burst of the flexible pipe. If the pipe resistance against the external pressure is too low the external pressure may ultimately result in deformation and/or Birdcaging of the flexible pipe and/or collapse of the innermost sealing sheath which is acting as the primary barrier towards outflow of a fluid transported in the flexible pipe. Simultaneously the flexible pipe may be subjected to highly corrosive fluids and chemical resistance may be needed. Furthermore, it is important that the weight of the pipe is kept sufficiently low as a too high weight may render certain use impossible. Furthermore the weight may also influence production and deployment costs.

In general flexible pipes are expected to have a lifetime of 20 years in operation.

The object of the invention is to provide a flexible pipe which pipe can be provided in long length with a desired strength and strength profile along its length and which pipe can be manufactured in a cost effective manner.

The present invention provides a novel flexible pipe and a method for its production which meet this object. The flexible pipe of the invention and embodiments thereof has shown to have a large number of advantages which will be clear from the following description.

DISCLOSURE OF INVENTION

The flexible pipe of the invention is as defined in the claims. According to the invention a new type of flexible pipes has been provided. The flexible pipe of the invention comprises an axis and a tubular innermost sealing sheath surrounding said axis, said innermost sealing sheath is surrounded by at least one outer armoring layer. The innermost sealing sheath has an inner side which is the side of the innermost sealing sheath comprising said axis. In other words all that is surrounded by the innermost sealing sheath is on the inner side of the innermost sealing sheath. On the inner side of said innermost sealing sheath the flexible pipe comprises a carcass comprising a plurality of annular armoring members.

Heretofore carcass of flexible pipes, such as flexible pipes for offshore applications, have as a standard been provided by helically winding of strips or profiles. The flexible pipes of the invention accordingly provide a completely new concept which has been found to have a large number of unpredictable benefits.

The flexible pipe of the invention with a carcass comprising a plurality of annular armoring members can accordingly be produced in a simple manner and with a strength, corrosion resistance and weight profile which is optimized to its use. The flexible pipe of the invention provides new opportunities and a new design freedom which further result in the opportunity of designing pipes which can be used for offshore use at high depth, in corrosive environments, and/or subjected to high external (from outside towards the pipe) and internal (from the inside of the pipe) pressure and pressure variations.

Furthermore, the method of the invention provides a new production strategy that will allow for employment of materials, shapes and thicknesses of a carcass which is not obtainable by conventional production methods and accordingly new flexible pipes with new combinations of properties can be provided.

In the following the term "length of the pipe" is used to mean the length along the axis of the pipe. This space inside the innermost sealing sheath is also referred to as the bore of the pipe.

The terms "axial direction" or "axially" are used to mean the direction along the length of an axis of the pipe. Generally it is desired that the flexible pipe is substantially circular in cross sectional shape, however, it should be understood the flexible pipes could have other cross sectional shapes such an oval, elliptical or slightly angular (angular with rounded edges). The axis of the flexible pipes may in such situations be determined as the most central axis in the bore of the flexible pipe. The term "outside" and "inside" a member and/or a layer are used to mean "outside, respectively inside said member and/or a layer in radial direction from, and perpendicular to the axis of the pipe and radially out an outermost surface of the pipe.

Generally the annular armoring members are arranged along the length or a part of the length of the flexible pipe. As indicated above flexible pipes can be very long. The flexible pipe of the invention should preferably be at least about 50 meters, such as at least about 500 meters, such as at least about 1000 meters, such as at least about 2000 meters or more, said annular armoring members are arranged along at least a part of the length of the flexible pipe.

Due to the unique structure of the flexible pipe of the invention the flexible pipe may in practice be even longer, since it may in an embodiment of the invention be produced with an optimized strength/weight profile such that it may be applied a depth which has not been possible with prior art pipes. A main reason for this is that the deeper a flexible pipe is to be used, the higher will the requirement be to strength against collapsing due to external pressure. The higher strength that needs to be provided the higher the weight of the pipe will be. The higher weight the more difficult transportation and deployment and in practice deployment of a too heavy flexible pipe is impossibly since the flexible pipe will be torn apart before the flexible pipe has been final installed, in particular in situations where the flexible pipe is a riser pipe for transporting fluids in vertical direction e.g. from seabed to a sea surface installation such as a ship or a platform. The flexible pipe of the invention with optimized strength/weight profile will be described further below.

The term 'carcass' is used herein to mean one or more layers of annular armoring members, each layer designated a carcass layer. Each carcass layer comprises a plurality of annular armoring members. A carcass and/or a carcass layer may extent in the whole length of the flexible pipe or only in a section of the flexible pipe. A flexible pipe may for example comprise several carcass along its length as it is described further below. For example a first section (also called a carcass armored section) of a flexible pipe may have a first type of carcass and a second carcass armored section of the pipe may have a second type of carcass.

In one embodiment the carcass comprises at least one layer of annular armoring members. Depending on the structure of the carcass and the required or desired strength of the flexible pipes the flexible pipe may in part of the length or in the whole length of the flexible pipe comprise two or more carcass layers. Generally it is most optimal to have only one layer of carcass—also called a single layered carcass—since the stiffness of the carcass is higher with a single layered carcass of a certain thickness X than two layers of carcass with half the thickness x. However the higher the total thickness of the carcass the higher is the moment of inertia and often a high moment of inertia is desired.

A group of annular armoring members partly or totally placed upon each other and interconnected with each other is considered to be one layer of carcass. Two or more layers of a carcass, accordingly means two or more not-interconnected layers of annular armoring members.

According to the invention the annular armoring members can be arranged in many different ways with respect to each other. This is in fact one of the option which among others provides the large design freedom of the flexible pipe of the invention. Since the annular armoring members are provided as individual members, which beneficially can be pre-produced prior to the production of the flexible pipe, these annular armoring members can be provided in any desired configuration inside the bore of the flexible pipe.

An annular armoring member has a first front and a second front which first front and second front are defined as the geometric plans perpendicular to a centre axis surrounded by the annular armoring member and arranged on each side of and in contact with the annular armoring member.

In one embodiment the annular armoring members are arranged side-by-side in axial direction. "Side-by-side in axial direction" is taken to mean that the annular armoring members are arranged with their fronts substantially parallel when the flexible pipe is straight, and preferably with a maximal distance between side-by-side arranged annular armoring members of at most about the maximal cross-sectional dimension of the bore, i.e. the inner diameter (the diameter within the innermost sealing sheath) of the flexible pipe when the pipe has a substantially circular cross section. The distance between two side-by-side arranged annular armoring members is determined as the distance between the first front of the first annular armoring members and the front of the second annular armoring member facing the first front of the first annular armoring member.

In one embodiment the side-by-side arranged annular armoring members are preferably not overlapping each other. This provides a flexible pipe where the carcass allows a high bending degree. In particular in embodiments where the axial distance between annular armoring members are about the width or average width of the annular armoring members the carcass provides substantially no resistance against bending of the flexible pipe which in practice may result in a flexible pipe with a higher flexibility than prior art flexible pipe with a similar strength.

The width of the annular armoring members, also referred to as "the axial width" is defined as the maximal width in axial direction. The width can be determined as the distance between the first front and the second front of an annular armoring member. The thickness of the annular armoring members is defined as the maximal thickness perpendicular to the axial direction. If nothing else is mentioned, distances, thickness and width should be determined when the flexible pipe is in straight condition In one embodiment at least two, such as at least 10, such as at least 100 or more of the annular armoring members are axially spaced from each other, e.g. with an axially distance of up to the average width of the annular armoring members, such as with an axial distance of up to about 10 cm, such as with an axial distance of up to about 5 cm, such as with an axial distance of up to about 2 cm, such as with an axial distance of from about 1 to about 1 cm, such as with an axial distance of from about 2 mm to about 5 mm. In one embodiment at least two of said annular armoring members are arranged side-by-side and at least partly in contacting relation with each other. Two annular armoring members will be in total contacting relation with each other if a front of the first annular armoring member is in contact with a front of the second annular armoring member along the whole annular extent of the annular armoring members. Two annular armoring members will be in partly contacting relation with each other if a front of the first annular armoring member is in contact with a front of the second annular armoring member in one or more areas along annular extent of the annular armoring members.

Depending on the cross-sectional profile of the annular armoring members the carcass may provide more or less resistance against bending of the flexible pipe. If for example the cross-sectional profile of the annular armoring members are substantially square or has a similar shape where the side-by-side arranged annular armoring members have large surface areas in contact with each other the carcass may provide a high resistance against bending of the flexible pipe. Such a carcass with a high resistance against bending may in one embodiment be provided in a section of the flexible pipe whereas in other sections the flexible pipe may be more flexible. A carcass with a high resistance against bending may for example be provided in a section of the flexible pipe adjacent to a connection to an end-fitting, a ship, a platform, a clamping site or other element where a relative stiff flexible pipe section may be beneficial. An outermost layer—e.g. an outer sheath may comprise markings, such as color markings, along its length indicating the bending stiffness of the pipe.

In one embodiment at least two, such as at least 10, such as at least 100 or more of the annular armoring members are arranged side-by-side engagement and/or overlapping with each other.

Two annular armoring members will be engaged with each other when they are interlocked to prevent unlimited sliding. Overlapping annular armoring members may or may not be engaged with each other In one embodiment the flexible pipe comprises annular armoring members which are engaged with each other by being directly interconnected. Examples of type of interconnection are described below.

In one embodiment the carcass comprises at least one intermediate member arranged at least partly between the annular armoring members.

The intermediate member may be annular intermediate member extending all around the axis of the pipe, i.e. the intermediate member may be an annular armoring member it self, or the intermediate member may be non annular intermediate member, which do not extent all around the axis of the pipe, but for example provides 2, 3, 4 or more connecting sites along the annular extent of the annular armoring members.

This option of arranging intermediate members, and in particular non-annular intermediate members, provides the possibility of designing flexible pipe with characteristics which are completely new.

The annular armoring members may for example comprise one or more intermediate members, such as 3, 4 or more between two annular armoring members where the one or more intermediate members are engagement members arranged to engage with the two annular armoring members. Such an engagement may result in a carcass which is locked against axially extension beyond a desired level, whereas simultaneously high flexibility may be maintained. The intermediate engagement members may for example be in the form of clips e.g. of metal, elastic engagement member, such as rubber engagement members and/or change-like or wire-like engagement members connecting the annular armoring members to each other to limit the maximal distance between two annular armoring members to a desired level. In one embodiment the at least one intermediate member is a non-annular engagement member having an extent from about 0.001 to about 0.1 of the extent of the annular armoring members it is interconnecting.

In one embodiment the at least one intermediate member is a spacer, such as a flexible spacer providing a space between annular armoring members which for example may vary in dependence of forces applied to the flexible pipes. A flexible pipe with a carcass of annular armoring members with annular or non annular spacer(s) may be highly stable and allow high flexibility while simultaneously ensuring that this high flexibility is relatively slow acting such that structural elements or layers, e.g. sensors (optical sensors), anti-wear layers and e.t.c. of the flexible pipe are not subjected to damages due to high flexibility.

In one embodiment the at least one intermediate member is a non-annular spacer, i.e. the non-annular spacer does not have an annular extent, but for example an extent of ¼ around the axis of the pipe or less, such as an extent from about 0.001 to about 0.1 of the extent of the annular armoring members it is placed between.

The spacer may for example have a V or U shaped cross-sectional profile such that the "legs" of the V or U shape provides flexible legs which can be pressed together when the axial distance between two annular armoring members decrease below a selected level.

In one embodiment at least one of said annular armoring members is a ring shaped armoring member.

The terms "ring shaped annular armoring member" "and "ring shaped armoring member" are used interchangeably and are used herein to mean a annular armoring member which forms a complete ring around the axis in contrast to a coil-shape, which—all though forming a type of ring around the axis of the pipe—does not form a complete ring around the axis because it has two open ends that are not facing each other. Accordingly the terms "coil shaped annular armoring member" or "coil shaped armoring member" are used interchangeably and are used herein to mean an annular armoring member with at least one winding and which does not form a complete ring around the axis because it has two open ends that are not facing each other.

In one embodiment a plurality, such as at least half or more preferably all of the annular armoring members are ring shaped annular armoring members. It has been found that the ring shaped annular armoring members provides the flexible pipe with an extremely high collapse resistance (resistance against external pressure) compared to the known helically coiled carcass. It has for example been found that a carcass of ring shaped annular armoring members of a certain thickness and weight provides the flexible pipe with a collapse resistance which is significant higher that the collapse resistance provided by a prior art helically coiled carcass of similar thickness and weight. In situations where the ring shaped annular armoring members are of steel and has a thickness of about 3 mm or more the ring shaped annular armoring members have even shown to provide the flexible pipe with a collapse resistance which is at least 50% higher, or even at least 100% higher that the collapse resistance provided by a prior art helically coiled carcass of similar thickness and weight.

In one embodiment the ring shaped armoring member or each of the members is in the form of an endless ring shaped armoring member.

An endless ring shaped armoring member means a ring shaped armoring member which is completely locked in that it does not comprise any openings along its annular extent.

Preferably the endless ring shaped armoring member has no open ends. It may for example be made from a wire section or strip section with two ends which is formed to a ring and welded to close the two ends to each other. Other methods for providing the endless ring shaped armoring member are also available as described further below.

A carcass made from endless ring shaped armoring members have the additional advantage that it provides the flexible pipe with a high resistance towards internal pressure and thereby the flexible pipe is provided with high resistance against damaging resulting from high internal pressure such as upheaval buckling and/or burst of the flexible pipe.

In one embodiment the one or more ring shaped armoring members each is an open ring shaped armoring member.

An open ring shaped armoring member means a ring shaped armoring member which is not endless and which therefore comprises at least one opening where the ring can be opened by withdrawing ends of the ring from each other. The open ring shaped armoring member may e.g. be made from a wire section or strip section with two ends which is formed to a ring but without being welded so that the two ends can be parted from each other.

An open ring shaped armoring member can for example be produced in a very simple manner and cost effective manner from a wire section or strip section as described above. The open ring shaped armoring members has the additional advantage that the requirement to product tolerances may be less than the product tolerances available for endless ring shaped armoring members.

In one embodiment at least one of the annular armoring members is in the form of a coil shaped annular armoring member. In principle the coil shaped annular armoring member may comprise any number of windings including at least one winding, such as up to about 1000 windings, such as from 1 to about 100 windings such as from about 1.1 to about 10 windings.

One winding of a coil means one whole round about the axis of the flexible pipe. 1.1 winding of a coil means one whole round plus 10% of an additional round about the axis of the flexible pipe.

In practice, however, it is desired that the axial width of the coil shaped annular armoring member should not exceed about 5 meter, because the handling of very width coil shaped annular armoring members may be difficult. Preferably the width of the coil shaped annular armoring member should not exceed about 1 meter. A preferred width of the coil shaped annular armoring member is from about 2 cm to about 50 cm, such as from about 5 cm to about 20 cm. The coil shaped annular armoring members of about 1 m or less in width are relatively easy to handle. In one embodiment the coil shaped annular armoring members are arranged in a side-by-side relation so that a second end of a first coil shaped annular armoring member is placed in contact with or optionally in engagement with a first end of a second coil shaped annular armoring member, so at to provide a pseudo helically coil carcass. A pseudo helically coil carcass may have substantially similar mechanical and chemical properties as a prior art helically wound carcass if they are of the same material. However the coil shaped annular armoring members may be produced from other materials or materials combinations and the material may be treated differently to provide improved properties or combination of properties such as combined low weight/high strength properties. This will be described further below.

The annular armoring members each have a cross-sectional profile along their annular extent. The cross-sectional profile along the annular extent of an annular armoring member is taken to mean the profile in a cut through the annular armoring member perpendicular to its annular direction around the axis of the flexible pipe. When the annular armoring member is a ring shaped annular armoring member, the cross-sectional profile along its annular extent means its profile in a cut through the ring shaped annular armoring member parallel to the center axis of the pipe when the pipe is held in a straight position.

The respective annular armoring members may, independently of each other have a uniform cross-sectional profile along their respective annular extents or a non uniform cross-sectional profile along their respective annular extents.

In a preferred embodiment a plurality, such as half of them or more, such as all of the annular armoring members said annular armoring members have a uniform cross-sectional profile along their respective annular extents. The annular armoring members with uniform cross-sectional profile along their respective annular extents are generally simpler to handle than annular armoring members with non-uniform cross-sectional profile along their respective annular extents, in particular is situations where such annular armoring members with non-uniform cross-sectional profile along their respective annular extents needs to be rotationally oriented with respect to each other. However annular armoring members with non-uniform cross-sectional profile along their respective annular extents may have other advantages, for example if the annular armoring members have protruding flexible, interspaced elements arranged along their respective annular extents, and where the protruding element is for example protruding in axial direction towards an adjacent annular armoring members to allow a flexible axial displacement of the annular armoring members with respect to each other.

The annular armoring members may in principle have any cross-sectional profile along their annular extents, such as the cross-sectional profiles of known helically wound armoring profiles or folded strips, such as the cross-sectional profiles and combination of cross-sectional profiles of helically wound armoring profiles or folded strips described and shown in drawings in one or more of GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

As explained above the annular armoring members may comprise one or more engagement members. Such engagement members may have a cross-sectional profile along their annular extent as interconnected cross-sectional profiles of helically wound armoring profiles or folded strips described and shown in drawings in one or more of GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

In one embodiment the one or more said annular armoring members have cross-sectional profiles along their respective annular extents selected from a round (circular, oval) profile, an angular (quadrilateral, rectangular, square, rhomboid, trapezoid) profile, C shaped profile, a U shaped profile, a T-shaped profile, an I shaped profile, a K shaped profile, a Z shaped profile, an X shaped profile, a $\psi$, (psi) shaped profile and any combinations there combinations thereof.

In one embodiment the plurality of annular armoring members comprise a plurality of a first type of annular armoring members and a plurality of a second type of annular armoring members different from the first type of annular armoring members with respect to cross-sectional profile, wherein the plurality of first and second type of annular armoring members having a cross-sectional profile along their annular extents selected from a round (circular, oval) profile, an angular (quadrilateral, rectangular, square, rhomboid, trapezoid) profile, C shaped profile, a U shaped profile, a T-shaped profile, an I shaped profile, a K shaped profile, a Z shaped profile, an X shaped profile, a $\psi$ (psi) shaped profile and any combinations thereof. The first and the second type of annular armoring members may for example be arranged in random order along the length of the flexible pipe, in blocks, such as blocks of 2 to 500 annular armoring members along the length of the flexible pipe or alternately along the length of the pipe.

In one embodiment the first and second type of annular armoring members are arranged alternately and interconnected with each other i.e. the annular armoring members are in this embodiment annular engagement members.

It should be understood that the carcass of the flexible pipe may comprise several different interconnected or non-interconnected types of annular armoring members differing from each other with respect to cross-sectional profile.

In one embodiment at least one, preferably a plurality or even up to half of or all of the annular armoring members have a cross-sectional profile along their annular extent comprising one or more folds, preferably selected from an S shape folded profile, a C folded profile, a Q shape folded profile, an O shaped folded profile, and combinations thereof.

In one embodiment the carcass comprises a structure corresponding to the structure of the pressure armoring described in U.S. Pat. No. 3,908,703. In practice it has not been possibly to produce a pipe a described in U.S. Pat. No. 3,908,703 because it has never been solved how to arrange the pressure armor rings around a liquid tight innermost sealing sheath.

The annular armoring members may be produced by a plurality of different methods, naturally depending on the materials of which they are made. Whereas the prior art helically carcass in principle could only be produced by helically winding long a pipe length of profiles or folded strips, the carcass of the flexible pipe of the invention of the flexible pipe of the present invention can be produced by a range of method which can be adapted and optimized in relation to the specific flexible pipe, such that a simpler method and/or a flexible pipe with improved properties can be obtained.

In one embodiment the annular armoring members are made from a wire, such as a profiled wire. The wire may be provided with an annular shape e.g. as a ring shaped annular armoring members or a coil shaped annular armoring member, and the wire may be cut in desired length prior to or after providing the annular shape.

In one embodiment the annular armoring members are made from a strip, the strip may for example be pre-folded or it may be folded during production of the annular armoring member. The strip may be provided with an annular shape e.g. as a ring shaped annular armoring members or a coil shaped annular armoring member, and the strip may be cut in desired length prior to or after providing the annular shape.

After providing the annular armoring members from wire or strip to obtain the desired shape, the material may be subjected to an after treatment. Such an after treatment may for example include application of a protective coating, e.g. a corrosion resistive coating and/or an anti-friction coating. In one embodiment where the annular armoring members are of a metal the after treatment comprises a heat treatment e.g. to partly or totally annealing the material, thereby removing undesired material deformations which may be introduced during a cold deformation of the material. Such after treatment heat treatment may provide an improved material strength which has not been available for carcass of prior art flexible pipes.

In general it can be said that the thicker metal (preferably steel) wires or strips used the more residual stress will be generated in the material during cold deformation, which stress which may compromise the strength as well as the chemical resistance of the resulting carcass prior to heat treatment. Such stress is reduced or removed completely by the heat treatment, allowing the material to obtain desired chemical and structural properties.

As mentioned above a large number of production methods are available for producing the annular armoring members. As examples of production methods can be mentioned forging, casting, extrusion, molding, infusion molding, injection molding and/or coiling.

The method of production should naturally be selected in dependence of the desired material of which the annular armoring members should be made.

In principle any material or combination of materials with a sufficient strength can be used for the annular armoring members.

In one embodiment the annular armoring members are made from one or more materials, preferably selected from metal, such as aluminum, titanium, steel e.g. duplex steel, stainless steel and carbon steel, and fiber armed metals; polymers (including thermosetting polymers as well as thermoplastic polymers), such as polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS);

polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; and composit materials, such as a polymer (e.g. one of the above mentioned) compounded with reinforcement fibers, such as glass-fibers, carbon-fibers and/or aramide fibers.

The flexible pipe may for example comprise annular armoring members of different materials along its length such as it will be described further below.

Examples of highly useful materials are the materials described as useful for armoring layers in any of the prior art publications referred to above. Preferred materials which may be used separately or in any combinations comprises the composit material described in U.S. Pat. No. 4,706,713, the steel material described in U.S. Pat. No. 5,213,637, the steel material described in U.S. Pat. No. 5,407,744, the steel material described in U.S. Pat. No. 5,922,149, the steel material described in U.S. Pat. No. 6,291,079, the steel material described in U.S. Pat. No. 6,408,891, the steel material described in U.S. Pat. No. 6,904,939, the steel material described in U.S. Pat. No. 7,459,033, the steel material describe in WO 06097112, the composit material materials described in WO 05043020, the composit materials described in WO 02095281, the steel material describe in U.S. Pat. No. 6,282,933 and the steel material describe in U.S. Pat. No. 6,408,891.

The axial width of the annular armoring members may be from about 0.3 cm and larger, e.g. such as described above for coil shaped annular armoring member or in general up to for example about 1 m. Generally it is desired that the width of the annular armoring members is about 10 cm or less such as from about 1 to about 5 cm since the carcass can then be provided with both high strength and high flexibility.

The thickness of the annular armoring members perpendicular to the axial direction, may be a corresponding thickness of prior art coiled armoring layers, for example from about 1 mm to about 2 cm.

The carcass of the flexible pipe may comprise only identical annular armoring members or it may comprise 2, 3, 4, 5 or more annular armoring members which differ from each other.

In one embodiment the carcass comprises a plurality of annular armoring members which are substantially identical with each other, preferably the major part, such as substantially all of the annular armoring members are substantially identical with each other.

The substantially identical annular armoring members may be arranged along the whole length of the flexible pipe or only in one or more sections of the pipes.

In one embodiment the carcass comprises at least two different annular armoring members. Such two or more different annular armoring members may for example be arranged in random order along the length of the flexible pipe, in blocks, such as blocks of 2 to 500 annular armoring members along the length of the flexible pipe or alternately along the length of the flexible pipe.

In one embodiment the two or more different of annular armoring members are interconnected with each other and optionally placed to partly or totally overlap each other.

In one embodiment where at least two different annular armoring members differ from each other they may in principle differ from each other in any property or combination of properties. In one embodiment the at least two different annular armoring members differ from each with respect to one or more of their annular shape, such as coil shaped armoring member and/or ring shaped armoring member;

cross-sectional profile;

axial width;

thickness;

material or materials;

mechanical strength;

chemical resistance, in particular towards aggressive gasses such as methane, hydrogen sulphides and/or carbon dioxides; and corrosion resistance.

In one embodiment, an outermost layer—e.g. an outer sheath may comprise markings, such as color markings, along its length indicating one or more properties or differences in properties of the flexible pipe. The outer sheath may for example comprise a color marking at sites where the flexible pipe have a relatively strong carcass—and therefore is more resistant towards collapsing—indicating that at these marked sites clamps and/or other handlings/fixing element which can add substantially external force to the flexible pipe can be arranged.

The invention accordingly provides a flexible pipe which can be tailor made to its desired use and the properties along the length of the flexible pipe may vary. Thereby the flexible pipe does not need to be designed to fulfill maximum requirement in its whole length.

It is from U.S. Pat. No. 6,401,760 known to produce a flexible pipe witch over its length has sections intended for regions of different use by changing properties, such as thickness along the length of the strip which are helically wound to provide the carcass layer. This prior art method, however have a very limited use and only a slight modification along the length of the flexible pipe is possibly. The flexible pipe of the present invention with varying properties of the carcass along the length of the flexible pipe is much simpler to produce and may vary with respect to carcass and property/properties thereof to a much higher degree than prior art flexible pipes.

In one embodiment least two different annular armoring members differs from each other with respect to their stiffness. This can be provided by for example producing the annular armoring members from different materials, in different thickness and/or with different design.

The annular armoring members may for example be produced as a set of standard annular armoring members for a given inner diameter of a bore, where the set of standard annular armoring members comprises annular armoring members with different properties, e.g. different strength and/or different chemical resistance/corrosion resistance. For a given flexible pipe the carcass may be provided by selecting the annular armoring members from such set of standard annular armoring members, and the selected annular armoring members can be arranged along the length of the flexible pipe to provide the flexible pipe with tailor made properties.

Material with high chemical resistance/corrosion resistance are often more expensive than materials with inferior chemical resistance/corrosive. If the carcass need only be made from materials with high chemical resistance/corrosion resistance in certain sections of the flexible pipe, but not in the whole length of the pipe, large savings can be obtained by tailor making the flexible pipe of the invention accordingly.

Material with high strength and high corrosion resistance are often more expensive than materials with inferior strength and/or corrosion resistance. If the carcass need only be made from materials with high strength and/or corrosion resistance in certain sections of the flexible pipe, e.g. a section adapted to be used at large depth, but not in the whole length of the pipe, large savings can be obtained by tailor making the flexible pipe of the invention accordingly.

Annular armoring members of high strength will generally be heavier than annular armoring members of less strength. If the carcass need only having high strength in certain sections of the flexible pipe, e.g. a section adapted to be used at large depth, but not in the whole length of the pipe, the total weight of the flexible pipe can be reduced, which make it possibly to use the flexible pipe for transporting of fluids from larger depth, even down to about 3 km depth or more, compared to what is possibly today. The weight to strength combined property is for many applications an important factor both with respect to cost of the flexible pipe and applicability of the flexible pipe.

The flexible pipe of the invention may further be provided with sections with no carcass, such sections are herein referred to as non-carcass armored sections.

In one embodiment the flexible pipe comprises at least one carcass armored section along its length comprising a plurality of annular armoring members on the inner side of said innermost sealing sheath, said carcass armored section of the flexible pipe preferably has a length along the pipe axis of from about 10 cm to the whole length of the pipe, such as from about 50 cm to about 3000 meters, such as from about 1 mm to about 2000 meters.

In one embodiment the flexible pipe comprises at least one non-carcass armored section along its length comprising no annular armoring members on the inner side of said innermost sealing sheath. The non-carcass armored section of the flexible pipe may for example have a length along the pipe axis up to about 2000 meters, such as up to about 1000 meters, such as up to about 500 meters, such as from about 1 meter to about 100 meters.

In one embodiment the flexible pipe comprises a sea surface section adapted to be the section of the flexible pipe closer to the sea surface and a seabed section adapted to be closer to the seabed. In this embodiment the flexible pipe may for example have a carcass of low strength and/or low corrosion resistance annular armoring members or no carcass at all in its sea surface section; whereas the flexible pipe in its seabed section comprises a carcass of high strength and/or high corrosion resistance annular armoring members.

In one embodiment the flexible pipe comprises two or more carcass armored sections along its length, each comprising a plurality of annular armoring members on the inner side of said innermost sealing sheath, where the two or more carcass armored sections of the flexible pipe preferably differs from each other e.g. with respect to one or more of their
mechanical strength, such as stiffness;
chemical resistance, such as resistance towards aggressive gasses such as methane, hydrogen sulphides and/or carbon dioxides; and
corrosion resistance.

In one embodiment the flexible pipe comprises a carcass inner support layer arranged innermost to the carcass. Such carcass inner support layer is fluid pervious, preferably liquid pervious, preferably such that a fluid pressure e.g. a liquid pressure will be substantial identical on both sides of the carcass inner support layer. The carcass inner support layer is preferably continuous along at least a part of the length of the flexible pipe. The carcass inner support layer may be applied to simplify the production of the flexible pipe.

In one embodiment the annular armoring members are applied directly upon such carcass inner support layer, whereby the carcass inner support layer can support the annular armoring members during production of the pipe at least until the innermost sealing sheath is applied to surround the annular armoring members.

In one embodiment the flexible pipe comprises a carcass outer support layer arranged between the carcass and the innermost sealing sheath. The, carcass outer support layer is fluid pervious, preferably liquid pervious, preferably such that it does not provide an innermost sealing sheath in it self. The carcass outer support layer is preferably continuous along at least a part of the length of said flexible pipe. In one embodiment the carcass outer support layer is arranged to protect a sensor placed in the bore between the carcass outer support layer and the innermost sealing sheath. Further information and embodiments of flexible pipes comprising sensors are described below.

In one embodiment the carcass outer support layer is applied directly upon said annular armoring members.

The carcass inner support layer and/or the carcass outer support layer may be of any material that does not make the flexible pipe too stiff. Preferably the carcass inner support layer and/or the carcass outer support is/are of one or more materials selected from metals, polymers and/or textile, such as an extruded and perforated layer or polymers and/or textile, such as an extruded and perforated layer or a wound and/or a woven and/or a braided layer, e.g. shaped as a hosiery. Examples of polymer materials are as described. In a preferred embodiment the carcass inner support layer and/or the carcass outer support are in the form of a mesh, such as an aramide, a polyamide or a polyester mesh. In one embodiment the carcass outer support layer is a wound polyester film.

The flexible pipe may comprise one or more additional layers such as layers of flexible pipes known from prior art.

The flexible pipe of the invention may accordingly be combined with any additional layers selected from the layers of flexible pipes described in any one of the prior art documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

In one embodiment the flexible pipe is an unbounded pipe, the flexible pipe preferably comprises two or more outer armoring layers, preferably comprising at least one pressure armoring layer and at least one tensile armoring layer, preferably anti-wear layer or layers are applied between the outer armoring layers. Such layers are described in the above mentioned prior art publications.

Such outer armoring layer or layers may for example comprise one or more of the materials selected from metals or fiber reinforced polymers or both metals and fiber reinforced polymers, e.g. any of the materials described above.

Such outer armoring layer or layers may preferably be in the form of helically wound profiles and/or folded strips as described in the above prior art publications.

In one embodiment such outer armoring layer or layers is/are in the form of helically wound profiles and/or folded strips.

In one embodiment the flexible pipe comprises an outer sheath. The outer sheath may preferably be liquid impervious. The outer sheath may for example be a polymer sheath. Such outer sheath is described in the above mentioned prior art publications.

In one embodiment the flexible pipe comprises one or more additional polymer layers and/or metal layers such as, one or more thermal insulation layers, and one or more film and/or foil layers. Such layers are described in the above mentioned prior art publications.

In one embodiment the flexible pipe of the invention comprises a sensor for example as described in any one of U.S. Pat. No. 7,024,941, WO 2008077410, WO 2009106078 and DK PA 2009 01086.

The invention also relates to method of producing a flexible pipe as the flexible pipe described above. The method comprises:
providing a plurality of annular armoring members,
arranging said annular armoring members to surround an axis,
applying an innermost sealing sheath to surround said axis and said annular armoring members, and
applying an outer armoring layer.

The annular armoring members may be as described above.

In one embodiment a mandrel is used to support the annular armoring members at least until the innermost sealing sheath is applied to surround said annular armoring members. The annular armoring members may for example be applied one by one to a rear end of a mandrel and pushed forward to a front end of the mandrel while simultaneously the innermost sealing sheath are extruded onto the annular armoring members between the rear and the front end of the mandrel. A sluice system can be arranged at the rear end of the mandrel for sluicing in the annular armoring members as they are applied onto the mandrel while simultaneously holding the mandrel in a desired position.

In one embodiment the annular armoring members are arranged to surround the axis of the pipe in a continuous fashion as they are held together, preferably
 by being interconnected e.g. by one or more engagement member as described above; and/or
 by application of a continuous layer, such as a carcass inner support layer, on which the annular armoring members are arranged; and/or
 by application of a continuous layer, such as a carcass outer support layer and/or the innermost sealing sheath to surround the annular armoring members.

In one embodiment the annular armoring members is arranged to surround the axis in a continuous fashion as the innermost sealing sheath is applied to surround the annular armoring members. The innermost sealing sheath may preferably be extruded onto the annular armoring members.

In one embodiment the method comprises providing a carcass support inner layer and arranging said plurality of annular armoring members to surround said carcass support layer, preferably in direct contact with said carcass support layer. The carcass support inner layer may for example be applied on a mandrel, and be used to carry the annular armoring members from a rear end towards a front end of the mandrel.

In one embodiment the method comprises arranging the annular armoring members to engage each other optionally with an intermediate engagement member as described above. After the annular armoring members have been arranged to engage each other the innermost sealing sheath is extruded.

In one embodiment the method comprises arranging a carcass outer support layer onto said annular armoring members prior to applying the innermost sealing sheath.

The optimal method of producing a flexible pipe of the invention depends largely on the desired structure of the flexible pipe and its carcass. However, in practice the method of the invention has been found to be simple to optimize and in general cost-effective.

As mentioned above additional layers, e.g. as the additional layers described above, may be applied to the flexible pipe.

In one embodiment the method comprises applying one or more layers outside the innermost sealing sheath, the one or more layer outside said innermost sealing sheath being
 one or more outer armoring layers; and/or
 one or more anti-wear layers; and/or
 one or more additional polymer layers; and/or
 one or more thermal insulation layers; and/or
 one or more film and/or foil layers.

Methods of applying such additional are well known to the skilled person, and further information can for example de found in the above mentioned prior art publications.

In one embodiment the annular armoring members are made from one or more materials, preferably selected from metal, such as aluminum, titanium, steel e.g. duplex steel, stainless steel and carbon steel, and fiber armed metals; polymers (including thermosetting polymers as well as thermoplastic polymers), such as polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyetherether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; and composit materials, such as a polymer (e.g. one of the above mentioned) compounded with reinforcement fibers, such as glass-fibers, carbon-fibers and/or aramide fibers.

The annular armoring members may for example be produced as described above. In one embodiment the annular armoring members are made from one or more profiles, such as profiled one or more wires and/or one or more polymer profiles, e.g. provided by extrusion, casting or molding, e.g. injection molding.

In one embodiment the annular armoring members are made from a strip. The strip may for example be a folded strip or the strip may be folded during production of the annular armoring member.

In one embodiment the annular armoring members are made by forging, casting, extrusion, infusion molding, molding and/or coiling.

In one embodiment the annular armoring members are made from one or more materials comprising a metal, said method comprising subjecting said metal to deformation in solid state, followed by heat treating said metal, preferably annealing said metal.

In one embodiment the method comprises providing the flexible pipes with at least one carcass armored section along its length, such that said carcass armored section comprises a plurality of annular armoring members on the inner side of said innermost sealing sheath.

In one embodiment the method comprises providing the flexible pipes with two or more carcass armored sections along its length, each comprising a plurality of annular armoring members on the inner side of said innermost sealing sheath, said two or more carcass armored sections of the flexible pipe are preferably provided such that they differs from each other e.g. with respect to one or more of their mechanical strength, such as stiffness;
chemical resistance, such as resistance towards aggressive gasses such as methane, hydrogen sulphides and/or carbon dioxides; and
corrosion resistance.

BRIEF DESCRIPTION OF DRAWINGS

The invention will be explained more fully below in connection with a preferred embodiment and with reference to the drawings in which:

FIG. 2b is a schematic side view of the annular armoring member of FIG. 2a.

FIG. 3b is a schematic side view of the annular armoring member of FIG. 3a.

FIG. 6b is a schematic side view of the annular armoring member of FIG. 6a.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
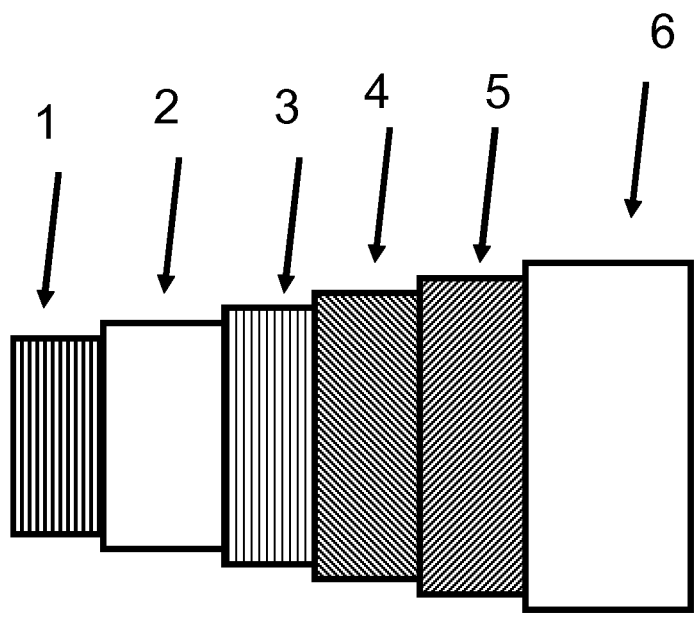
FIG. 1 is a schematic side view of a pipe with a carcass.

The flexible pipe shown in FIG. 1 has a typically pipe structure and comprises an innermost sealing sheath 2, often also called an inner liner, e.g. of cross linked polyethylene (PEX), polyimide (PA-11, PA 12) PVDF as well as other flour containing polymers. Inside the innermost sealing sheath 2 the pipe comprises an carcass 1, called a carcass. On the outer side of the innermost sealing sheath 2, the flexible pipe comprises three outer armoring layers 3, 4, 5. The outer armoring layer 3 closest to the innermost sealing sheath 2, is a pressure armoring layer 3, made from profiles and/or strips wound at a steep angle to the centre axis of the pipe, e.g. close to 90 degrees. Around the pressure armoring layer 3, the pipe comprises a pair of cross wound tensile armoring layers 4, 5, made from wound profiles and/or strips, wherein one of the tensile armoring layers 4 has an angle above 55 degrees, typically between 60 and 75 degrees, and wherein the other one of the tensile armoring layers 5 has an angle below 55 degrees, typically between 30 and 45 degrees. The piper further comprises an outer sheath 6 protecting the armoring layer mechanically and/or against ingress of sea water. The flexible pipe may have fewer or further pipe than the pipe of FIG. 1, for example the pipe may have additional layers such as an insulation layer, anti wear layers and etc. As described above the carcass comprises a plurality of annular armoring members.

A flexible pipe with the above structure of FIG. 1 will typically have outer armoring layers of metal such as steel as described above. However, as described above, a lot of other materials, such as composite materials are available.

In one embodiment, the flexible pipe—e.g. as shown in FIG. 1—is intended to carry fluid under pressure, which fluid comprises $H_2 S$. The pipe comprises a body, an innermost sealing sheath, at least one steel armoring layer withstanding stresses induced by the inside/outside pressure difference, at least one outer tension-resisting steel armoring layer spirally wound at an angle less than 45° in relation to the axis of the pipe, and at least the armoring layer withstanding stresses induced by the inside/outside pressure difference is made of a determined steel meeting $H_2 S$ resistance criteria, and in that at least the tension-resisting armoring layer is made from steel wires that do not meet $H_2 S$ resistance criteria. The flexible pipe may for example be as described in U.S. Pat. No. 6,408,891 with the difference that the carcass comprises a plurality of annular armoring members as described herein.

Figure 2A:
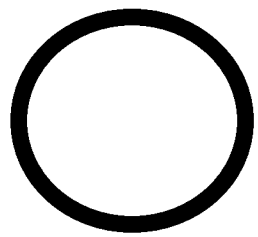
FIG. 2a is a schematic front view of an annular armoring member in the form of an endless ring shaped armoring member.
Figure 2B:

FIGS. 2a and 2b show an annular armoring member in the form of an endless ring shaped armoring member with a very simple structure seen respectively in a front view and in a side view. The endless ring shaped armoring member shown in FIGS. 2a and 2b is not in it self an annular engagement member.

Figure 2C:
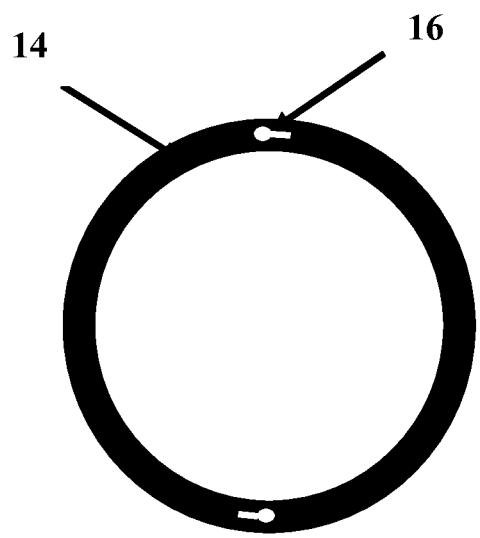
FIG. 2c is a schematic front view of an annular armoring member in the form of an endless ring shaped armoring member.
Figure 2D:
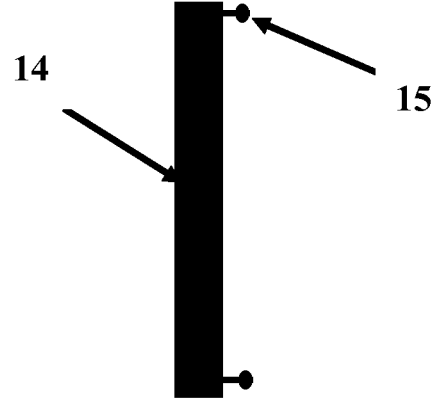
FIG. 2d is a schematic side view of the annular armoring member of FIG. 2c.

FIGS. 2c and 2d show a variation of the endless ring shaped armoring member of FIGS. 2a and 2b seen respectively in a front view and in a side view. The endless ring shaped armoring member shown in FIGS. 2c and 2d is in it self an annular engagement member. The endless ring shaped armoring member comprises a first front 14, and a second front carrying two protruding engagement elements 15. The first front 14 comprises holes 16 into which the engagement elements 15 of another identical or similar annular ring shaped armoring member can be inserted and slightly turned to be in an at least temporally fixed position. In that way a plurality of annular armoring members can be arranged and at least temporally fixed to each other in a side-by-side relation. The plurality of annular armoring members should preferably be fixed to each other in a side-by-side relation with a sufficient strength to withstand manipulation until the innermost sealing sheath is applied. At this time the interconnection provided by the engagement elements 15 and the holes 16 is no longer required and in certain situations even undesired since the engagement may reduce the flexibility of the flexible pipe too much. It should naturally be understood that the annular armoring members could have more than two engagement elements 15 and holes 16. In an alternative embodiment a glue or epoxy is applied to the holes 16 for increasing the engagement strength.

Figure 3A:
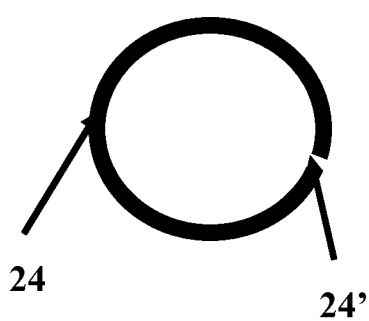
FIG. 3a is a schematic front view of another annular armoring member in the form of an open ring shaped armoring member.
Figure 3B:
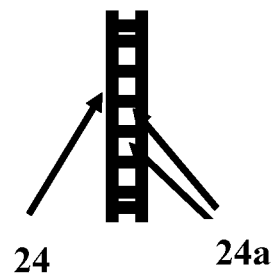

FIGS. 3a and 3b show another annular armoring member 24 in the form of an open ring shaped armoring member. The open ring shaped armoring member comprises an opening 24'. When the flexible pipe comprising such open ring shaped armoring members are subjected to external pressure, the pressure applied to the open ring shaped armoring members will likely be pressed such that the ends of the open ring shaped armoring member 24 will come into contact and e.g. be pressed together. For providing a strong open ring shaped armoring member 24 the open ring shaped armoring member 24 comprises a pair of open rings fixed to each other by bars 24a.

Figure 4:
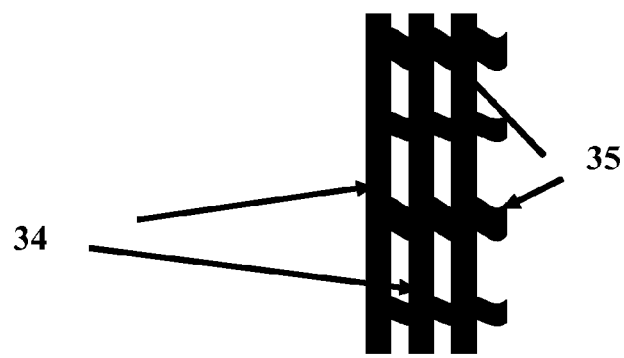
FIG. 4 is a schematic side view of a plurality annular armoring members with spacers.

FIG. 4 is a schematic side view of a plurality annular armoring members 34 with spacers 35. The spacers may for example be fixed to one of the fronts of one of the annular armoring members 34. The spacers 35 provide that it is relatively simple to arrange the annular armoring members 34 with desired distances to each other. The spacers 35 may for example differ along the length of the pipe such that in certain length sections of the pipe the distance between the annular armoring members 34 are longer than in other length sections.

Figure 5:
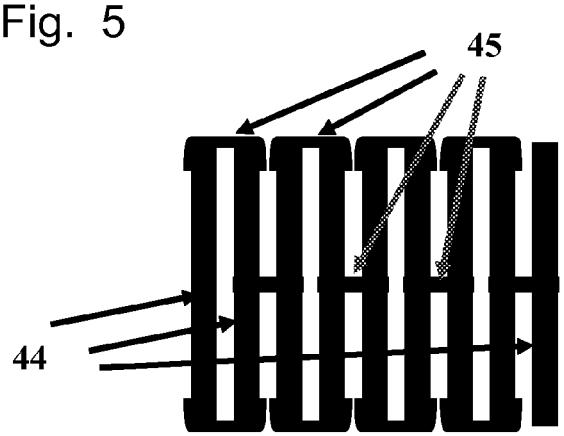
FIG. 5 is a schematic side view of a plurality annular armoring members with engagement members.

FIG. 5 is a schematic side view of a plurality annular armoring members 44 with engagement members 45. In the shown embodiment, each annular armoring member 44 is connected to a neighboring annular armoring member 44 by two engagement members 45. The engagement members 45 are clips-like elements which are not annular.

Figure 6A:
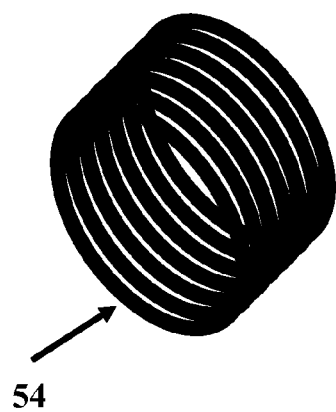
FIG. 6a is a perspective view of a coil shaped annular armoring member.
Figure 6B:
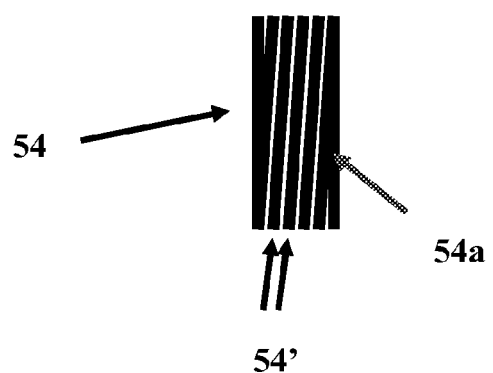

FIG. 6a is a perspective view of a coil shaped annular armoring member 54. The coil shaped annular armoring member 54 comprises a number of windings 54'. At the first and the second sides of the coil shaped annular armoring member 54, it may for example be closed to form a ring shape 54a.

FIGS. 7a, 7b, 7c, 7d and 7e are cross sectional views of different annular armoring members, showing the respective profiles of the annular armoring members. These annular armoring members may preferably be folded as described above.

Figure 7A:
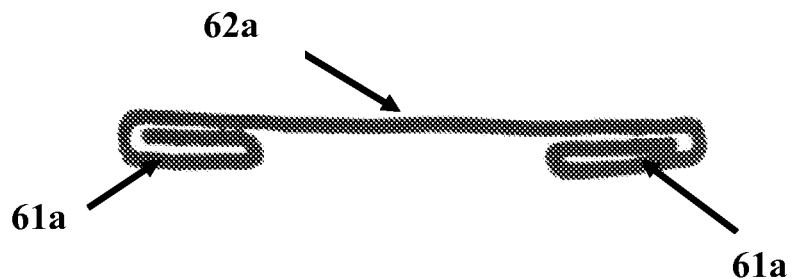
FIGS. 7a, 7b, 7c, 7d, 7e are cross sectional views of different annular armoring members, showing the respective profiles of the annular armoring members.

The annular armoring member of FIG. 7a comprises a relatively straight mid section 62a and folded edge sections 61a providing the annular armoring member with protruding edges which may be engaged with a neighboring annular armoring member.

Figure 7B:
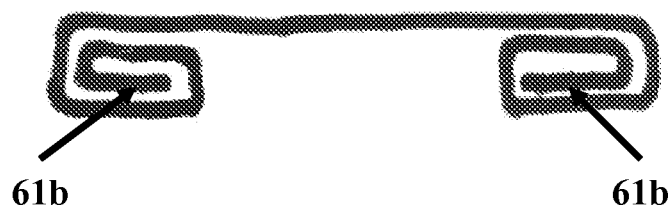

The annular armoring member of FIG. 7b comprises a relatively straight mid section and folded edge sections 61b providing the annular armoring member with protruding edges which may be engaged with a neighboring annular armoring member. The annular armoring member of FIG. 7b is slightly higher than the annular armoring member of FIG. 7a.

Figure 7C:

The annular armoring member of FIG. 7c comprises a relatively straight mid section and folded edge sections 61c providing the annular armoring member with protruding edges which may be engaged with a neighboring annular armoring member. The annular armoring member of FIG. 7d is slightly higher than the annular armoring member of FIG. 7b in that it is more folded along its edge section.

Figure 7D:

The annular armoring member of FIG. 7d comprises a relatively straight mid section and folded edge sections 61d providing the annular armoring member with protruding edges which may be engaged with a neighboring annular armoring member. The protruding edges of the annular armoring member of FIG. 7d protrude in the opposite direction than the protruding edges of the annular armoring member of for example FIG. 7a.

Figure 7E:

The annular armoring member of FIG. 7e comprises a relatively straight mid section and folded edge sections 61e providing the annular armoring member with protruding edges which may be engaged with a neighboring annular armoring member. The folded edge sections 61e comprises reinforcement elements 65, which preferably may be ring shaped reinforce element 65.

Figure 8:
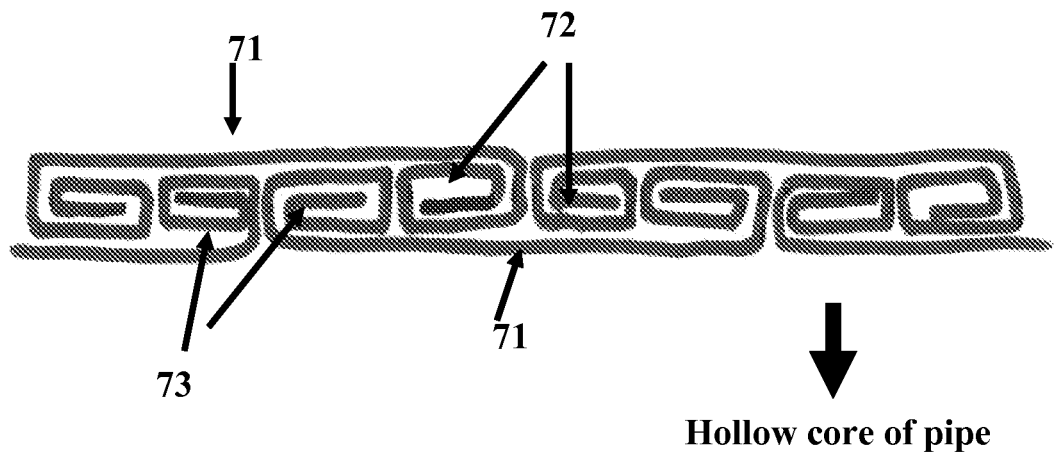
FIG. 8 is a cross sectional view in a cut along the length of the flexible pipe of a plurality annular armoring members engaged with each other.

FIG. 8 is a cross sectional view of a plurality annular armoring members 71 engaged with each other. The annular armoring members 71 comprises folded edge sections 73 which are engaged with folded edge sections 73 of neighboring annular armoring members 71. The annular armoring members 71 may for example be as shown in any one of FIGS. 7a, 7b, 7c, 7d and 7e.

Figure 9:
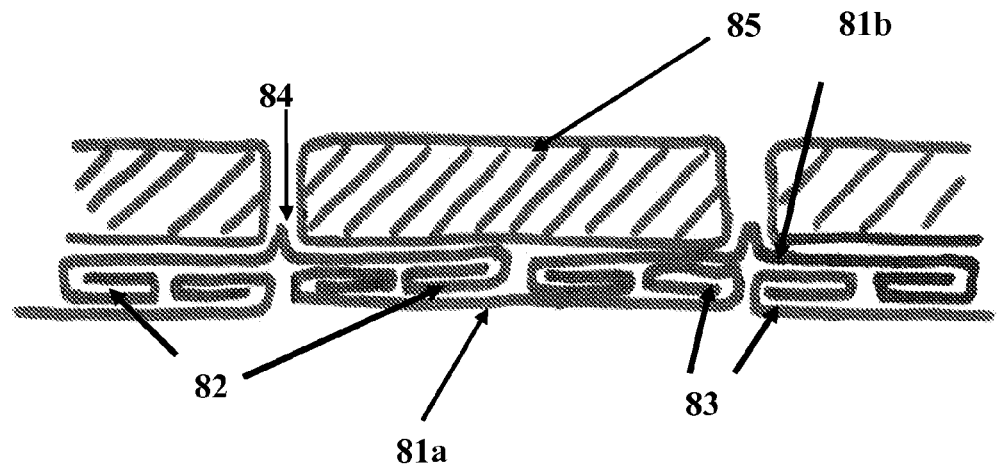
FIG. 9 is a cross sectional view in a cut along the length of the flexible pipe of a plurality annular armoring members in two layers comprising one layer of annular armoring members engaged with each other.

FIG. 9 is a cross sectional view of a plurality annular armoring members, 81a, 81b, 85 in two layers comprising one layer of annular armoring members 81a, 81b engaged with each other.

The carcass comprises a first layer of engaged annular armoring members 81a, 81b. This first layer is supposed to be the innermost layer and comprises a first type of annular armoring members 81a and a second type of annular armoring members 81b alternately arranged along the flexible pipe. The first type of annular armoring members 81a comprises a relatively straight mid section and folded edge sections 83 providing the annular armoring member 81a with protruding edges which are be engaged with neighboring annular armoring members 81b. The second type of annular armoring members 81b comprises a mid section with a ridge 84 protruding away from the bore of the flexible pipe and folded edge sections 82 providing the annular armoring member 81b with protruding edges which are be engaged with neighboring annular armoring members 81a. The second layer of the carcass is in the form of simple non-engaged ring elements 85, e.g. open ring elements which may be simpler to apply upon the first carcass layer.

Figure 10:
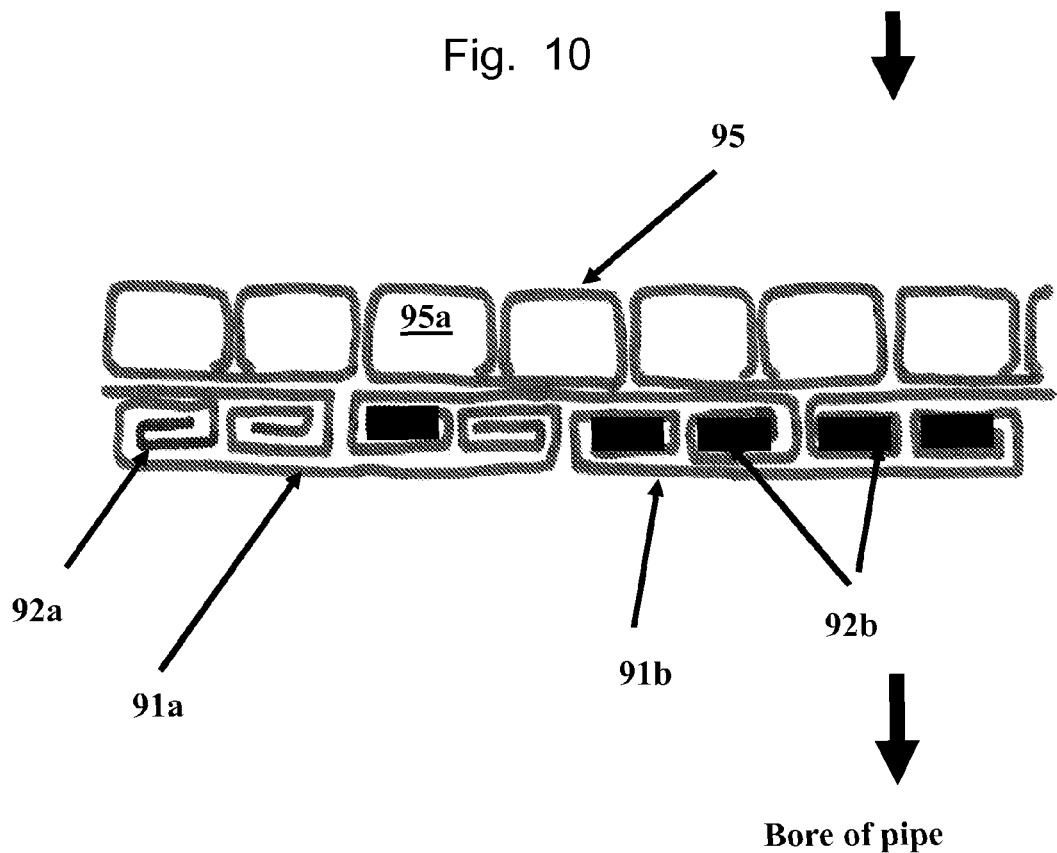
FIG. 10 is a cross sectional view in a cut along the length of the flexible pipe of a plurality annular armoring members in two layers comprising one layer of annular armoring members engaged with each other.

FIG. 10 is a cross sectional view of a plurality annular armoring members 91a, 91b, 95 in two layers comprising one layer of annular armoring members 91a, 91b engaged with each other.

The carcass comprises a first layer of engaged annular armoring members 91a, 91b. This first layer is supposed to be the innermost layer and comprises a first type of annular armoring members 91a and a second type of annular armoring members 91b arranged in blocks along the flexible pipe. The first type of annular armoring members 91a comprises a relatively straight mid section and folded edge sections 92a providing the annular armoring member 91a with protruding edges which are be engaged with neighboring annular armoring members 91a, 91b. The second type of annular armoring members 91b comprises a relatively straight mid section and folded edge sections 92b comprising reinforcement elements and providing the annular armoring member 91b with protruding edges which are be engaged with neighboring annular armoring members 91a, 91b. The second layer of the carcass is in the form of folded non-engaged ring elements 95, comprising relatively large tube shaped cavities 95 providing the carcass with a high moment of inertia.

FIGS. 11a, 11b, 11c and 11d are cross sectional views of different annular armoring members, showing the respective profiles as they are engaged with each other. These annular armoring members may for example be produced from profiled wires and/or folded strips as described above or they may be produced using any other method e.g. as described above.

Figure 11A:
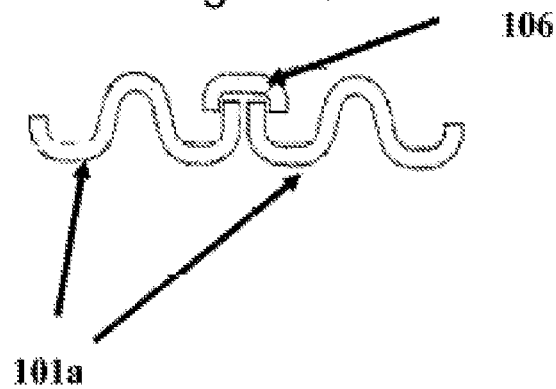
FIGS. 11a, 11b, 11c and 11d are cross sectional views of different annular armoring members, showing the respective profiles as they are engaged with each other.
Figure 11B:
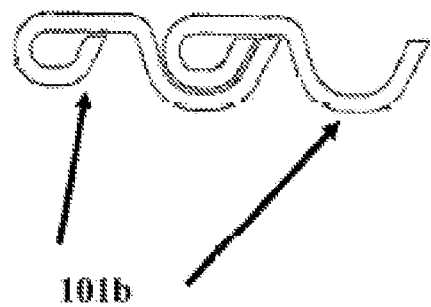

The annular armoring members 101b of FIG. 11b comprises two slightly Q shaped engaged annular armoring members 101b.

Figure 11C:
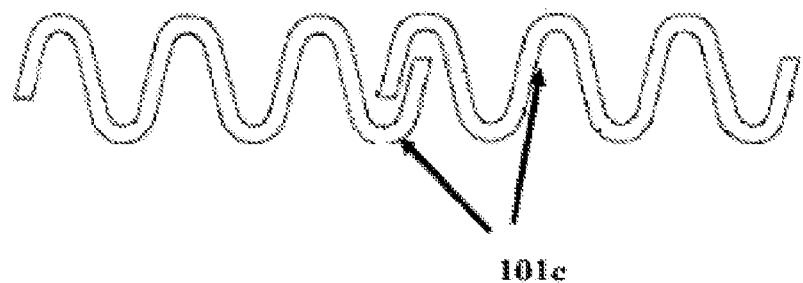

The annular armoring members 101c of FIG. 11c comprises two multiple wave shaped engaged annular armoring members 101c.

Figure 11D:
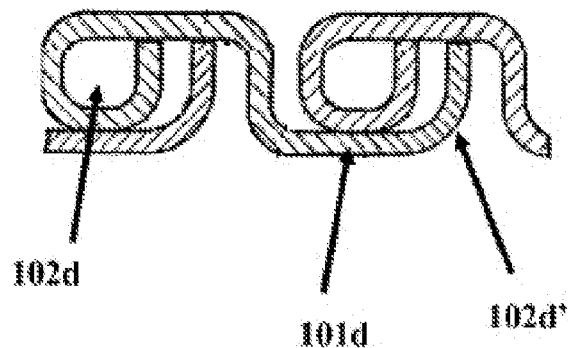

The annular armoring members 101d of FIG. 11d comprises two Q shaped engaged annular armoring members 101d. As it can be seen the Q shaped engaged annular armoring members 101d comprises a first edge section which is folded to form a ring shaped profiled edge section 102d and a second edge 102d' section which is slightly bended to engage with the ring shaped profiled edge section 102d.

Figure 12:
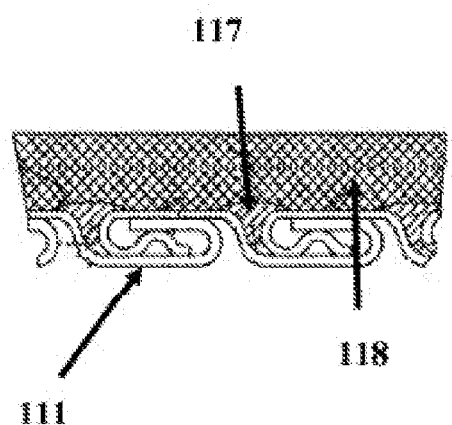
FIG. 12 is a cross sectional view of a layer of engaged annular armoring members, an innermost sealing sheath and a deformable material applied in interstitial spaces between the annular armoring members.

FIG. 12 is a cross sectional view of a layer of engaged annular armoring members 111, an innermost sealing sheath 118 and a deformable material 117 applied in interstitial spaces between the annular armoring members. The annular armoring members each has an S shaped cross sectional profile. The deformable material 117 may preferably be an elastomer e.g. as described in U.S. Pat. No. 5,601,893.

Figure 13A:
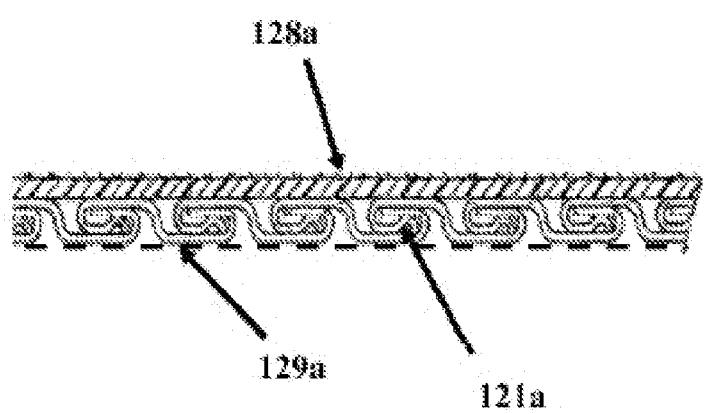
FIG. 13a is a cross sectional view of a layer of engaged annular armoring members with a surrounding innermost sealing sheath and arranged to surround a carcass inner support layer.

FIG. 13a is a cross sectional view of a layer of engaged annular armoring members 121a with a surrounding innermost sealing sheath 128a and arranged to surround a carcass inner support layer 129a.

Figure 13B:
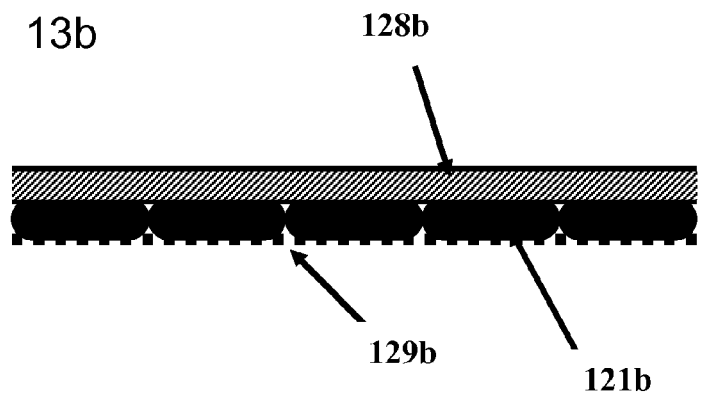
FIG. 13b is a cross sectional view of a layer of not engaged annular armoring members with a surrounding innermost sealing sheath and arranged to surround a carcass inner support layer.

FIG. 13b is a cross sectional view of a layer of not engaged annular armoring members 121b with a surrounding innermost sealing sheath 128b and arranged to surround a carcass inner support layer 129b. A not shown carcass outer support layer e.g. in the form of a wound polyester film may be arranged between the annular armoring members 121b and the inner support layer 129b to avoid or reduce interpenetration of material of the innermost sealing sheath 128b into interstitial spaces between the annular armoring members 121b.

Figure 14:
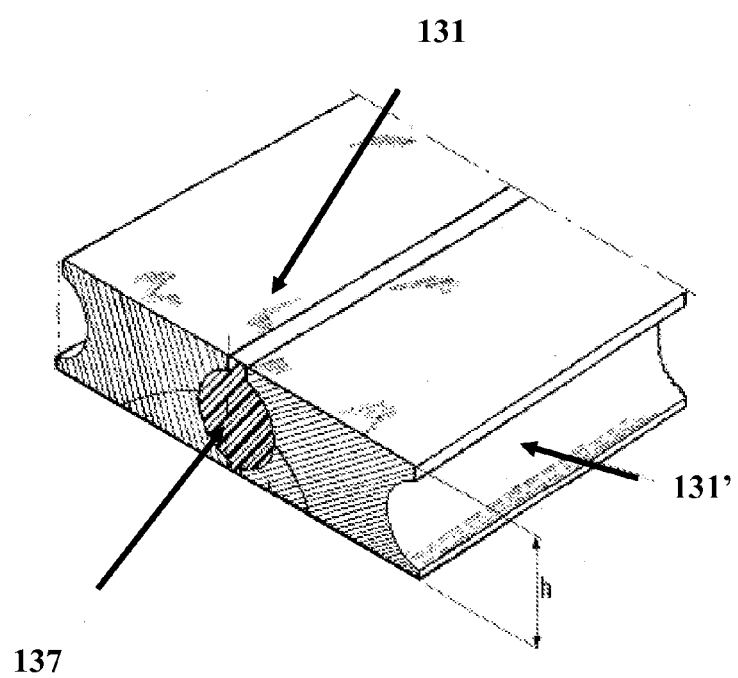
FIG. 14 is a perspective vied of a cross sectional cut through two annular armoring members with an intermediate member.

FIG. 14 is a perspective vied of a cross sectional cut through two annular armoring members 131 with an intermediate member 137 e.g. an annular elastomer intermediate member 137. The annular armoring members 131 comprise each a first and a second front 131' with a concave shape. The intermediate member 137 is arranged in a cavity provided between the two annular armoring members 131 as they are arranged in side-by side relation. The intermediate member 137 provides the flexible pipe with a high flexibility.

FIGS. 15a, 15b, 15c, 15d, 15e, 15f, 15g and 15h are cross sectional views of different combinations of annular armoring members, showing the respective profiles as they are engaged with each other. These annular armoring members may for example be produced from profiled wires as described above or they may be produced using any other method e.g. as described above.

Figure 15A:
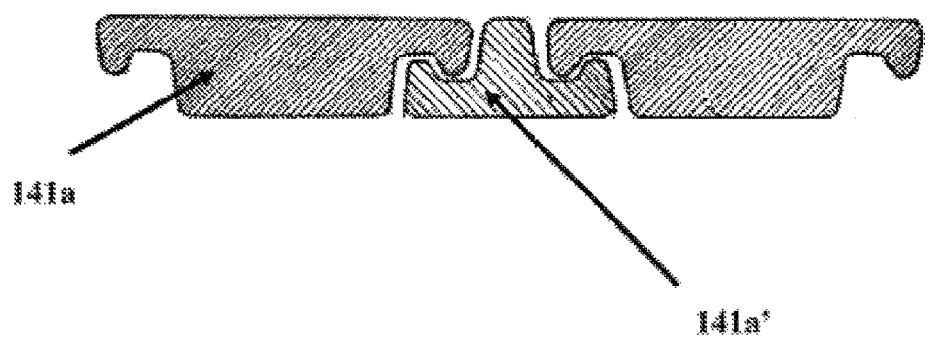
FIGS. 15a, 15b, 15c, 15d, 15e, 15f, 15g and 15h are cross sectional views of different combinations of annular armoring members, showing the respective profiles as they are engaged with each other.

The annular armoring members 141a, 141a' of FIG. 15a comprises two different types of annular armoring members 141a, 141a' arranged in an alternating order along the flexible pipe. Both of the types of annular armoring members 141a, 141a' have T shaped cross sectional profiles.

Figure 15B:
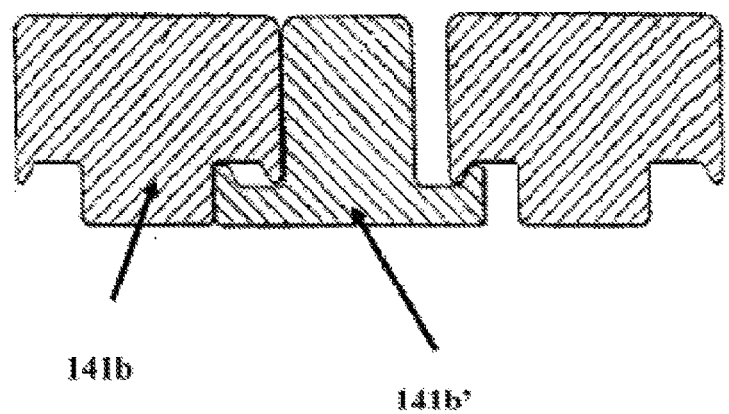

The annular armoring members 141b, 141b' of FIG. 15b comprises two different types of annular armoring members 141b, 141b' arranged in an alternating order along the flexible pipe. Both of the types of annular armoring members 141b, 141b' have T shaped cross sectional profiles. The annular armoring members 141b, 141b' have a larger thickness (h) than the annular armoring members 141a, 141a'.

Figure 15C:
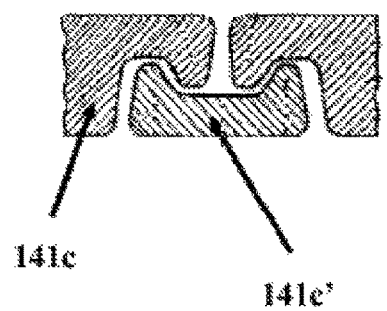

The annular armoring members 141c, 141c' of FIG. 15c comprises two different types of annular armoring members 141c, 141c' arranged in an alternating order along the flexible pipe. A first one of the types of annular armoring members 141c have T shaped cross sectional profiles and a second type of annular armoring members 141c' have C shaped cross sectional profiles. It is desired that the annular armoring members 141c, 141c' are arranged such that the head of the T shaped armoring members 141c are facing towards the not shown innermost sealing sheath.

Figure 15D:
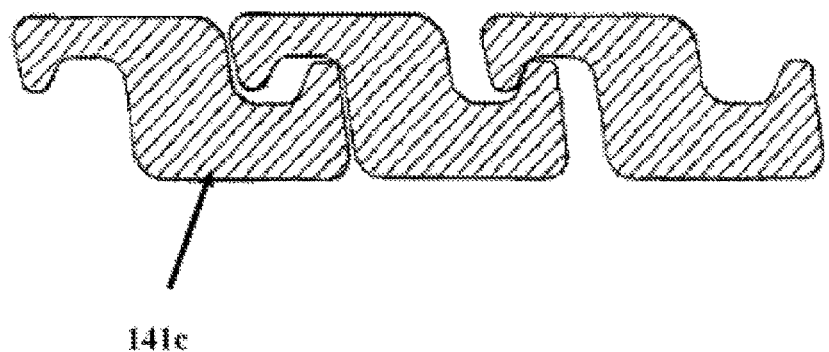

The engaged annular armoring members 141d of FIG. 15d comprises only one type of annular armoring members 141d having a Z shaped cross sectional profiles.

Figure 15E:
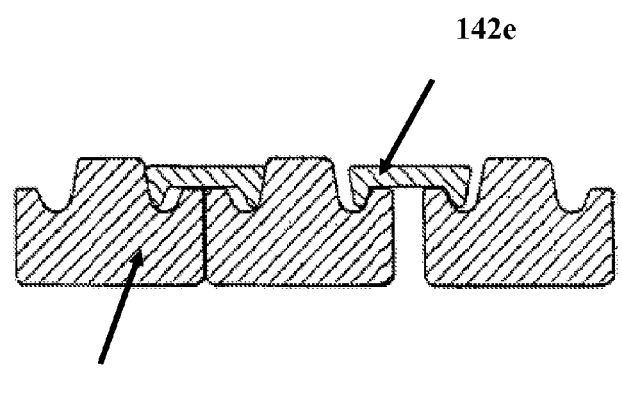

The annular armoring members 141e of FIG. 15e comprises only one type of annular armoring members 141e having T shaped cross sectional profiles. The annular armoring members 141e are engaged by engagement members 142e.

Figure 15F:
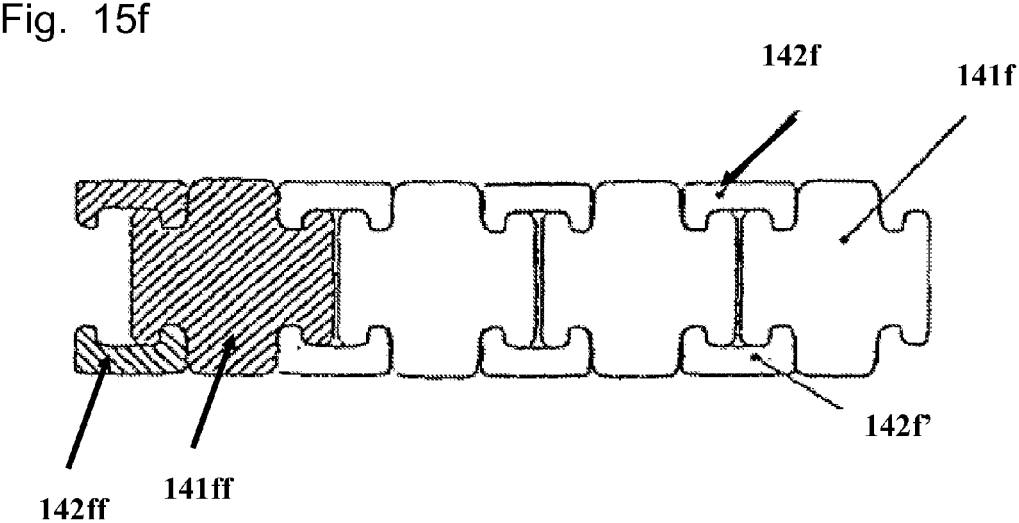

The annular armoring members 141f of FIG. 15f comprises only one type of annular armoring members 141f with X shaped cross sectional profiles. The annular armoring members 141f are engaged by engagement members 142f and 142f'. As indicated with the shaded annular armoring members 141ff and shaded engagement members 142ff, the various elements and/or members of the carcass may be of different materials, thereby varying the properties of the carcass along the length of the flexible pipe.

Figure 15G:
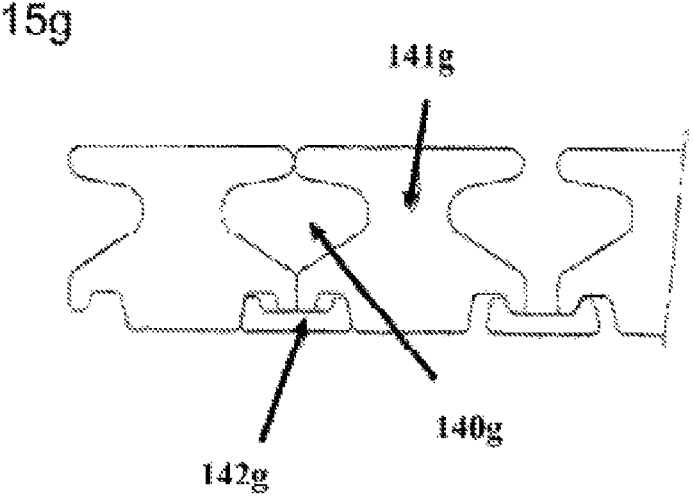

The annular armoring members 141g of FIG. 15g comprises only one type of annular armoring members 141g having ψ shaped cross sectional profiles. The annular armoring members 141g are engaged by C shaped engagement members 142g. As seen a large annular cavity 140g are arranged between the side-by-side arranged annular armoring members 141g thereby reducing the amount and weight of material without reducing thickness accordingly.

Figure 15H:
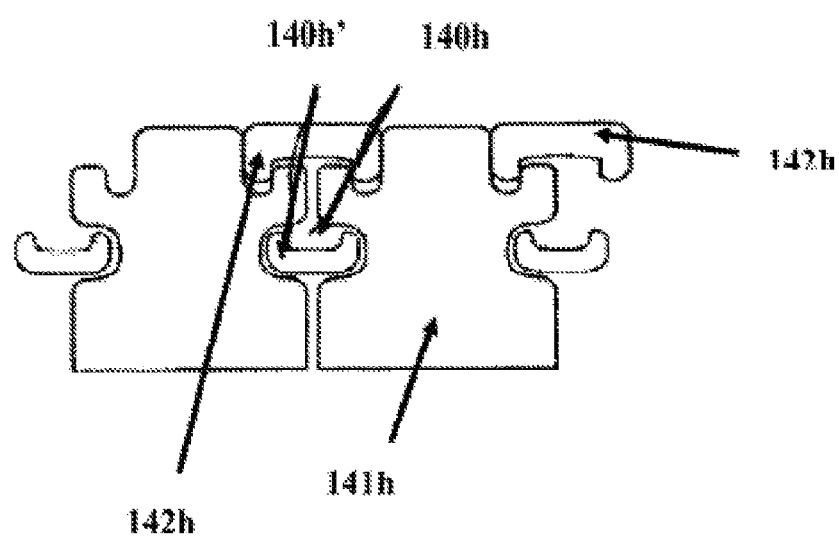

The annular armoring members 141h of FIG. 15h comprises only one type of annular armoring members 141h having K shaped cross sectional profiles. The annular armoring members 141h are engaged by C shaped engagement members 142h. As seen an annular cavity 140h are arranged between the side-by-side arranged annular armoring members 141h thereby reducing the amount and weight of material without reducing thickness accordingly. A reinforcement element 140 h' may be arranged in the annular cavity 140h.

Figure 16:
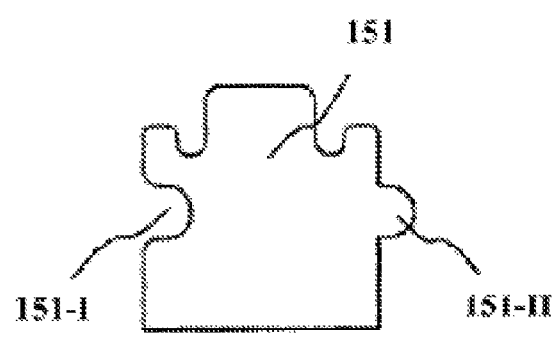
FIG. 16 is a cross sectional view of an annular armoring member which can be arranged to engage with not shown adjacent annular armoring members.

FIG. 16 is a cross sectional view of an annular armoring member 151 which can be arranged to engage with not shown adjacent annular armoring members. The annular armoring member 151 has a K shaped cross sectional profile with an additional protruding ridge 151-II along one of its fronts. Along the other one of its fronts the annular armoring member 151 has a cavity 151-I corresponding to the protruding ridge 151-II, such that two of the annular armoring members 151 arranged in side-by-side relation will be engaged with each other.

Figure 17:
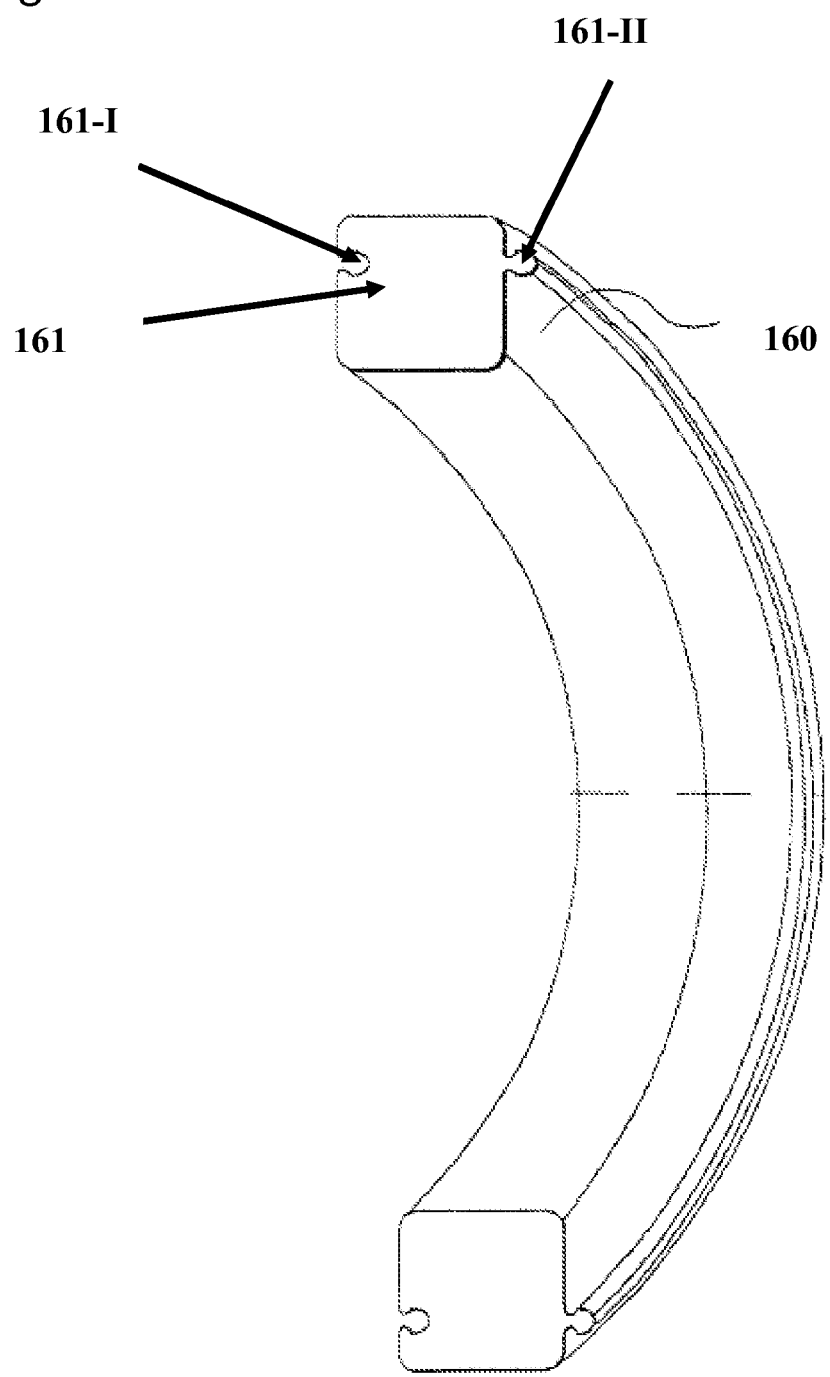
FIG. 17 is a perspective vied of a half annular armoring member which can be arranged to engage with not shown adjacent annular armoring members.

FIG. 17 is a perspective vied of a half annular armoring member 160 which can be arranged to engage with not shown adjacent annular armoring members. The annular armoring member 160 has a rod shaped cross sectional profile with a protruding ridge 161-II along one of its fronts. Along the other one of its fronts the annular armoring member 160 has a cavity 161-I corresponding to the protruding ridge 161-II, such that two of the annular armoring members 161 arranged in side-by-side relation will be engaged with each other.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

What is claimed is:

1. A flexible pipe comprising:
   an axis,
   a tubular innermost sealing sheath surrounding said axis, said innermost sealing sheath forming a barrier against an outflow of a fluid conveyed through the flexible pipe,
   at least one outer armoring layer surrounding said innermost sealing sheath, and having an inner side which is the side of the innermost sealing sheath comprising said axis, and
   a carcass located on the inner side of the innermost sealing sheath, said carcass comprising a plurality of ring-shaped annular armoring members, each made from one or more materials comprising a metal, wherein each of the ring-shaped annular armoring members forms a complete ring around the axis, and wherein at least two of said annular armoring members are arranged side-by-side in engagement and/or overlapping with each other.

2. The flexible pipe as claimed in claim 1, wherein said flexible pipe has a length along said axis, and said annular armoring members are arranged along the length of the flexible pipe.

3. The flexible pipe as claimed in claim 1, wherein said annular armoring members are arranged side-by-side in axial direction.

4. The flexible pipe as claimed in claim 1, wherein at least two of said annular armoring members are arranged side-by-side at least partly in contacting relation with each other.

5. The flexible pipe as claimed in claim 1, wherein at least one of said annular armoring members has a cross-sectional profile along its annular extent selected from a round profile, an angular profile, C shaped profile, a U shaped profile, a T-shaped profile, an I shaped profile, a K shaped profile, a Z shaped profile, an X shaped profile, a ψ (psi) shaped profile and combinations thereof.

6. The flexible pipe as claimed in claim 1, wherein said plurality of annular armoring members comprise a plurality of a first type annular armoring members and a plurality of a second type annular armoring members different from the first type annular armoring members with respect to cross-sectional profile, wherein the plurality of the first and second type of annular armoring members have a cross-sectional profile along their annular extent selected from a round profile, an angular profile, C shaped profile, a U shaped profile, a T-shaped profile, an I shaped profile, a K shaped profile, a Z shaped profile, an X shaped profile, a ψ (psi) shaped profile and combinations thereof.

7. The flexible pipe as claimed in claim 1, wherein said annular armoring members are made from one or more materials, selected from metals, polymers and composite materials.

8. The flexible pipe as claimed in claim 1, wherein the carcass comprises a plurality of annular armoring members which are substantially identical with each other.

9. The flexible pipe as claimed in claim 1, wherein the carcass comprises at least two different annular armoring members.

10. The flexible pipe as claimed in claim 9, wherein the at least two different annular armoring members differ from each other with respect to one or more of their
   annular shape;
   cross-sectional profile;
   axial width;
   thickness;
   material or materials;
   mechanical strength;
   chemical resistance; and
   corrosion resistance.

11. The flexible pipe as claimed in claim 9, wherein the at least two different annular armoring members differ from each other with respect to their stiffness.

12. The flexible pipe as claimed in claim 1, wherein the carcass has a length along the pipe axis of from about 10 cm to the whole length of the pipe.

13. The flexible pipe as claimed in claim 1, wherein the flexible pipe comprises two or more carcass armored sections along its length, each comprising a plurality of annular armoring members on the inner side of said innermost sealing sheath, said two or more carcass armored sections of the flexible pipe being different from each other e.g. with respect to one or more of their mechanical strength, such as stiffness;

chemical resistance, such as resistance towards aggressive gasses, such as methane, hydrogen sulphides and/or carbon dioxides; and corrosion resistance.

14. The flexible pipe as claimed in claim 1, wherein the flexible pipe comprises a carcass inner support layer innermost to the carcass, said carcass inner support layer being fluid pervious, said annular armoring members are applied directly upon said carcass inner support layer.

15. The flexible pipe as claimed in claim 1, wherein the flexible pipe comprises a carcass outer support layer arranged between the carcass and the innermost sealing sheath, said carcass outer support layer being fluid pervious, said carcass outer support layer is applied directly upon said annular armoring members.

16. The flexible pipe as claimed in claim 1, wherein the annular armoring members are engaged with each other by being directly interconnected.

17. The flexible pipe as claimed in claim 1, wherein each of the annular armoring members comprises folded edge sections configured to engage with the folded edge sections of neighboring annular armoring members.

18. A flexible pipe comprising:

an axis, a tubular innermost sealing sheath surrounding said axis, said innermost sealing sheath forming a barrier against an outflow of a fluid conveyed through the flexible pipe, at least one outer armoring layer surrounding said innermost sealing sheath, and having an inner side which is the side of the innermost sealing sheath comprising said axis, a carcass located on the inner side of the innermost sealing sheath, said carcass comprising a plurality of annular armoring members, each made from one or more materials comprising a metal, wherein at least two of said annular armoring members are arranged side-by-side in engagement and/or overlapping with each other, and at least one non-carcass armored section comprising no annular armoring members on the inner side of said innermost sealing sheath, said at least one non-carcass armored section having a length along the pipe axis of up to 2000 meters, wherein the carcass has a length along the pipe axis of from about 10 cm to the whole length of the pipe.

* * * * *